United States Patent
Busick et al.

(10) Patent No.: US 11,179,700 B2
(45) Date of Patent: *Nov. 23, 2021

(54) ACTIVATION ENERGY REDUCERS FOR CATALYTIC OXIDATION OF GASEOUS MIXTURES

(71) Applicant: Rohm and Haas Company, Collegeville, PA (US)

(72) Inventors: Jon Busick, Houston, TX (US); Philippe P. Maillot, Kingwood, TX (US); Joy L. Mendoza, Seabrook, TX (US)

(73) Assignee: Rohm and Haas Company, Collegeville, PA (US)

( * ) Notice: Subject to any disclaimer, the term of this patent is extended or adjusted under 35 U.S.C. 154(b) by 181 days.

This patent is subject to a terminal disclaimer.

(21) Appl. No.: 16/485,982

(22) PCT Filed: Feb. 20, 2017

(86) PCT No.: PCT/US2017/018557
§ 371 (c)(1),
(2) Date: Aug. 14, 2019

(87) PCT Pub. No.: WO2018/151733
PCT Pub. Date: Aug. 23, 2018

(65) Prior Publication Data
US 2020/0230577 A1 Jul. 23, 2020

(51) Int. Cl.
*B01J 23/42* (2006.01)
*B01J 23/46* (2006.01)
*B01J 12/00* (2006.01)
*B01J 35/06* (2006.01)
*C01C 3/02* (2006.01)

(52) U.S. Cl.
CPC ............ *B01J 23/42* (2013.01); *B01J 12/005* (2013.01); *B01J 12/007* (2013.01); *B01J 23/464* (2013.01); *B01J 35/06* (2013.01); *C01C 3/0216* (2013.01)

(58) Field of Classification Search
CPC ............ B01D 2255/00; B01D 2255/10; B01D 2255/102; B01D 2255/902; B01D 2255/904; B01J 23/00; B01J 23/38; B01J 23/40; B01J 23/90; B01J 23/96; B01J 35/00; B01J 37/00; C01B 21/40; C22B 7/009; C08J 11/00
See application file for complete search history.

(56) References Cited

U.S. PATENT DOCUMENTS

| 3,660,024 | A | | 5/1972 | Gillespie |
| 4,410,449 | A | * | 10/1983 | Diessel .................... B01J 23/92 |
| | | | | 502/24 |
| 4,435,373 | A | | 3/1984 | Knapton et al. |
| 4,863,893 | A | | 9/1989 | Farrauto et al. |
| 7,576,030 | B2 | | 8/2009 | Benderly |
| 10,143,998 | B2 | * | 12/2018 | Busick .................. C01C 3/0216 |

FOREIGN PATENT DOCUMENTS

| EP | 0519699 A1 | 12/1992 | |
| GB | 2 064 975 A | * 6/1981 | .............. B01J 35/06 |

* cited by examiner

*Primary Examiner* — Timothy C Vanoy
(74) *Attorney, Agent, or Firm* — Brian L. Mutschler

(57) ABSTRACT

The present invention provides materials for improving the ignition of gaseous reactants in metal catalyzed oxidation reactions comprising a metal catalyst gauze, preferably, a platinum/rhodium catalyst gauze, having in contact therewith, from 0.5 to 1.5 wt. %, based on the weight of the metal catalyst gauze, of one or more pieces of previously used metal catalyst gauze. Further, methods of making the metal catalyst materials comprise shaping the pieces of previously used metal catalyst gauze and placing them equidistant from each other in contact with or on the surface of the metal catalyst gauze. And methods of using the materials comprise feeding into the reactor a gas mixture of oxygen or air and one or more reactant gases, and igniting the gas mixture at the surface of one or more or all of the pieces of previously used metal catalyst.

10 Claims, No Drawings

ACTIVATION ENERGY REDUCERS FOR CATALYTIC OXIDATION OF GASEOUS MIXTURES

The present invention relates to metal catalyst materials and methods for improving the catalyst enhanced ignition of gaseous reactants in various metal catalyzed oxidation reactions. In particular, the present invention relates to metal catalyst materials comprising a metal catalyst gauze having one or more pieces of previously used gauze in contact therewith, methods of making the same, and to methods of using the metal catalyst materials to improve the ignition of gas reactants at the surface of the metal catalyst gauzes used in industrial scale metal catalyzed oxidation reactions including, but not limited to, the manufacture of hydrogen cyanide from ammonia and methane (Andrussow process), the manufacture of nitric acid from the oxidation of ammonia (Ostwald process), the manufacture of acetylene from methane and oxygen, to the production olefins, and alkynes and to the treatment of synthesis gas (carbon monoxide and hydrogen).

Metal catalyzed oxidations provide a number of important chemical manufacturing processes. Examples include, but are not limited to, manufacture of hydrogen cyanide from methane and ammonia, acetylene from methane and oxygen, nitric acid from the oxidation of ammonia (Ostwald process), ethylene from ethane, propylene from propane, formaldehyde from methanol, and the processing of synthesis gas from steam reforming of methane. In one example, the commercial manufacture of hydrogen cyanide, a metal catalyzed oxidative coupling (in the presence of oxygen) of methane and ammonia takes place in the presence of a metal catalyst which is a platinum/rhodium catalyst gauze. The reaction occurs by passing preheated feed gases through platinum/rhodium gauzes and igniting the gases at the surface of the catalysts at temperatures greater than 270° C.

Unfortunately, metal catalyst gauze enhanced ignition startup problems, including the difficulty of igniting reactants when using new catalysts, contaminated catalysts and damaged catalysts can often result in significant production losses, including additional catalyst costs and reactor down time associated with subsequent failed attempts to restart the catalyst enhanced ignition. Failure of ignition requires clearing the reactor to purge raw material gases; and because the metal catalyst gauze cools off, the whole start-up process must be repeated again. This leads to unwanted flaring of ammonia and natural gas, and lost production volume. In addition, overall yields of catalyzed products are negatively impacted as a result of one or more catalyst ignition failures. There are a number of possible causes for ignition failure at the catalyst surface including, but not limited to, contamination of the catalyst due to one or more organic residues from feed gases, one or more lubricating and/or compressor oils associated with the reactor and combinations thereof. Despite techniques known in the art to enhance the catalyzed ignition process or lower the catalyst activation energy, including increasing the flammability of the incoming reactant(s) feed, raising feed temperature, and increasing reactor pressure, reliable catalyst ignition remains a problem.

Catalyst enhanced ignition of reactants at the catalyst surface (also referred to as catalyst light off) at relatively low temperature is highly desirable. U.S. Pat. No. 4,863,893, to Farrauto et al. discloses lowering the ignition temperature of ammonia oxidation in the manufacture of nitric acid through use of platinum-rhodium and platinum-palladium-rhodium gauzes bearing a platinum coating in excess of 4.0 g/m² of platinum loading to the bulk area of the gauze (considered a sheet) to lower the ignition temperature required for light off in ammonia oxidation, especially if hydrogen is used as ignition fuel. Unfortunately, plating large or entire areas of woven catalyst gauzes with platinum black is expensive and cumbersome.

U.S. Pat. No. 7,576,030, to Benderly, discloses preparing an article from one or more sections of a used, contaminated or damaged metal catalyst gauze, treating it with a metal coating and contacting it with a metal catalyst gauze. The methods in Benderly enable one to promote the ignition of reactions at the surface of metal catalyst gauzes for use in various manufacturing process like those mentioned in the present invention. However, the Benderly method requires an expensive metal coating treatment of sections of a metal catalyst gauze to make articles that promote catalyst enhanced ignition.

The present inventors have endeavored to find a simple, reliable way to promote the improving the catalyst enhanced ignition of gaseous reactants at the surface of metal catalysts in catalyzed oxidation reactions, such as when using a new metal catalyst gauze.

STATEMENT OF THE INVENTION

1. In accordance with the present invention, metal catalyst materials comprise a metal catalyst gauze comprising wires or metal threads having a diameter of from 0.007 to 0.25 cm in diameter, such as up to 0.1 cm in diameter, preferably, a platinum/rhodium catalyst gauze, having in contact therewith, from 0.25 to 1.5 wt. %, or, preferably, from 0.50 to 1.0 wt. %, based on the weight of the metal catalyst gauze, of one or more pieces of previously used metal catalyst gauze, preferably, used platinum/rhodium catalyst gauze, that have not been contaminated with iron, or, preferably, not contaminated by non-platinum group metals in amounts of over 500 ppm, as determined by inductively coupled plasma-optical emission spectroscopy, and that have not been contaminated with foreign debris, hydrocarbons, or oil as tested by visual inspection, the one or more pieces placed equidistant from each other on the surface of the metal catalyst gauze, or, if one piece, placed in contact with or concentrically with the center of the metal catalyst gauze.

2. In accordance with the present invention as in 1, above, wherein the one or more pieces of previously used metal catalyst gauze number from 1 to 20 pieces, for example, 1 ring or annulus placed or arranged concentrically on the surface of the metal catalyst gauze, or from 2 to 20 or, preferably, 3 to 12 small pieces, such as strips.

3. In accordance with the present invention as in 1 or 2, above, wherein each of the one or more pieces of previously used metal catalyst gauze comprises a gauze of one or more metals selected from the group consisting of nickel, platinum, palladium, cobalt, rhodium, silver, gold, copper, iridium, rhenium, cerium, alloys thereof, binary alloys thereof, ternary alloys thereof, intermetallics thereof, and combinations thereof, preferably, a gauze of platinum, platinum alloys or combinations of from 5 to 25 wt. % of platinum and other metals, based on the total amount of metal in the used metal catalyst gauze.

4. In accordance with the present invention as in any of 1, 2, or 3, above, wherein the metal catalyst gauze is chosen from new catalysts, previously used catalysts, recycled catalysts, reconditioned catalysts, damaged catalysts, contaminated catalysts and combinations thereof.

5. In accordance with the present invention as in any of 1, 2, 3 or 4, above, wherein the metal catalyst gauze and the pieces of previously used metal catalyst gauze are each made from the same metal, metal alloy or combination of metals, preferably, a combination of metals containing platinum.

6. In accordance with the present invention as in any of 1, 2, 3 or 4, above, wherein the metal catalyst gauze and the pieces of previously used metal catalyst gauze are each made from a different same metal, metal alloy or combination of metals, preferably, a combination of metals containing platinum.

7. In another aspect of the present invention, methods of making metal catalyst materials for improving the ignition of gas reactants at the surface of metal catalysts in a reactor, such as a converter, used to oxidize gaseous reactants, such as ammonia, preferably, ammonia of at least 90 wt. % purity, based on the total weight of the ammonia, and methane, preferably, methane of at least 93 wt. % purity, based on the total weight of the methane, in making hydrogen cyanide, wherein the metal catalyst is a metal catalyst gauze comprising wires or metal threads having a diameter of from 0.007 to 0.25 cm in diameter, such as up to 0.1 cm in diameter, and chosen from a chosen from new catalysts, previously used catalysts, recycled catalysts, reconditioned catalysts, damaged catalysts, contaminated catalysts and combinations thereof, preferably a platinum/rhodium catalyst gauze, or, more preferably, a new platinum/rhodium catalyst gauze, comprising shaping, for example, by cutting, from 1 to 20 pieces, for example, 1 ring or annulus or from 2 to 20 or, preferably, 3 to 12 pieces, such as strips, of a previously used metal catalyst gauze material that have not been contaminated with iron, or, preferably, not contaminated by non-platinum group metals in amounts of over 500 ppm as determined by inductively coupled plasma-optical emission spectroscopy, and that have not been contaminated with foreign debris, hydrocarbons, or oil as tested by visual inspection, preferably, a used platinum/rhodium catalyst gauze, placing the one or more pieces of the used metal catalyst gauze equidistant from each other in contact with or on the surface of the metal catalyst gauze or, if one piece, placed in contact with or concentrically with the center of the metal catalyst gauze, wherein the total amount of the pieces of the previously used metal catalyst gauze ranges from 0.25 to 1.5 wt. % or, preferably, from 0.50 to 1.0 wt. %, based on the weight of the metal catalyst gauze. The methods may further comprise accessing the reactor, e.g. remotely, such as by using a robot, or by opening or disassembling the reactor to enable the placing of the one or more pieces of previously used metal catalyst gauze.

8. In accordance with the methods of making of the present invention as in item 7, above, further comprising, closing or reassembling the reactor for use, if needed, and then igniting the metal catalyst gauze.

9. In accordance with the methods of making of the present invention as in any one of items 7 or 8, above, wherein the total amount of the previously used metal catalyst gauze pieces ranges from 0.25 to 1.0 wt. %, or, preferably, from 0.50 to 1.0 wt. %, based on the weight of the metal catalyst gauze.

10. In yet another aspect of the present invention, methods of improving the ignition of gas reactants at the surface of metal catalysts in a reactor having a metal catalyst gauze comprising wires or metal threads having a diameter of from 0.007 to 0.25 cm in diameter, such as up to 0.1 cm in diameter, in contact with one or more pieces for example, 1 to 20 pieces, of previously used metal catalyst gauze that have not been contaminated with iron, or, preferably, not contaminated by non-platinum group metals in amounts of over 500 ppm as determined by inductively coupled plasma-optical emission spectroscopy, and that have not been contaminated with foreign debris, hydrocarbons, or oil as tested by visual inspection, the methods comprising preheating the metal catalyst gauze with air at a temperature of from 250 to 335° C., or, preferably, 275 to 320° C., preheating to a temperature of from 220 to 300° C., or, preferably, from 230 to 265° C., and feeding into the reactor a gas mixture of oxygen or air and one or more reactant gases to ignite the gas mixture at the surface of one or more or all of the one or more pieces of previously used metal catalyst, wherein the total amount of such pieces of the previously used metal catalyst gauze ranges from 0.25 to 1.5 wt. %, or, preferably, from 0.50 to 1.0 wt. %, based on the weight of the metal catalyst gauze.

11. In accordance with the methods of improving the ignition of gas reactants as in item 10, above, wherein the one or more pieces of metal catalyst gauze comprise 1 ring or annulus or from 2 to 20 or, preferably, 3 to 12 pieces, such as strips, placed on the surface of the metal catalyst gauze 12. In accordance with the methods of improving the ignition of gas reactants as in any one of items 10 or 11, above, wherein the reactant gases are chosen from ammonia and methane or hydrocarbons to make HCN or cyanides, ammonia to make nitric acid, methane to make acetylene, and $C_2$-$C_8$ alkanes to make $C_2$-$C_8$ alkenes, and/or treating carbon monoxide and/or hydrogen process gas present in the reactor during reaction, for example, to form methanol, respectively, carbon dioxide and water vapor, preferably, wherein when the reactant gas is ammonia, the reactant gas has a purity of at least 90 wt. %, based on the total weight of the ammonia, and, preferably, further wherein, when the reactant gas is methane or any hydrocarbon, the reactant gas has a purity of at least 93 wt. %, based on the total weight of the reactant gas.

Unless otherwise indicated, all percentage compositions are weight percentages (wt. %) and all temperatures are in ° C.

Unless otherwise indicated, all temperatures are room temperature and all pressures are standard pressure (~760 mm/Hg)

All ranges are inclusive and combinable. For example, the term "ranging from 0.25 to 1.0 wt. %, or, preferably, from 0.50 to 1.0 wt. %, based on the weight of the metal catalyst gauze" would include each of from 0.25 to 1.0 wt. %, or, or from 0.25 to 0.5 wt. %, or, preferably, from 0.50 to 1.0 wt. %, all weights based on the weight of the metal catalyst gauze.

As used herein, the term "ASTM" refers to publications of ASTM International, West Conshohocken, Pa.

As used herein, the term "concentrically" means having a common center within an uncertainty of 10% taken as a function of distance. Thus, a ring of used metal catalyst gauze place on a larger round metal catalyst gauze sheet is arranged concentrically if one side of the ring is 10 cm from the center of the sheet and the other side of the ring is 9 cm from the center of the ring.

As used herein, the term "ignition" or "catalyst enhanced ignition" refers to the light off of gas reactants, generally including oxygen or air, at the surface of a metal catalyst gauze as confirmed by visual observations and by temperature measurements using thermocouple devices. Ignition occurs spontaneously in the presence of the preheated catalyst and gas mixture.

As used herein, the term "inductively coupled plasma-optical emission spectroscopy" or "ICP" means a material analysis performed using a Perkin-Elmer Optima™ 5300-DV ICP-OES spectrometer (Perkin-Elmer, Inc., Waltham, Mass.). ICP data for metal catalyst materials was collected by using a segmented-array charge-coupled device (SCD) detector. The sample injection was performed using a quartz micro-concentric nebulizer attached to a cyclonic spray chamber and the spectrometer was set in the axial view mode. The samples were placed in 100 mL glass beakers covered with a watch glass and then digested with 15 mL of aqua regia (until the sample volume decreased to about 3 mL). Next, 50 mL of 18.2 megaohm ultrapure water were added to the digested samples and boiled for 15 min. Samples were cooled to room temperature and then transferred from the beaker into 100 mL volumetric flasks; the final volume was adjusted to 100 mL with 18.2 megaohm ultrapure water. Fifteen milliliters of each sample were transferred into a plastic tube and then placed onto the ICP autosampler for injection, analysis and data collection. Samples were analyzed using three-point calibration curves.

As used herein, the term "not been contaminated with foreign debris, hydrocarbons, or oil as tested by visual inspection" means that one with 20/20 vision whether corrected or not, would in full daylight not be able to see rust, debris, oil or hydrocarbon impurities on or in a given article.

As used herein, the term "purity" refers to the weight in grams of a recited material that actually comprises that material and not something else. For example, ammonia having 90 wt. % or greater purity consists of less than 10 wt, % of water or other materials that are not ammonia.

As used herein, the term "solids" or "total solids" on a given material or composition refers to all matter in that material or composition that is non-volatile in conditions of atmospheric pressure and room temperature. Water, ammonia and volatile solvents are not considered solvents.

As used herein, the term "ppm" or "parts per million" means parts by weight based on the total weight of a given thing. Aside from visual inspection, any metallic impurity in a metal catalyst gauze is determined by As used herein, the phrase "wt. %" stands for weight percent.

In the metal catalyzed oxidation of ammonia and methane to make hydrogen cyanide (HCN), when the yield of HCN has reached an unacceptably low level, the metal catalyst gauze is replaced with a new metal catalyst gauze. Reactions at the surface of such new gauzes are very difficult to ignite, causing extensive reactor downtime, for example, 3 hours or longer for each failed attempt to ignite. Often, it would take 10 or more tries to ignite a reaction using a new metal catalyst gauze. Now, the present inventors have discovered that catalyst pieces of used metal catalyst gauze promote ignition of reactions using a new metal catalyst gauze. The pieces of previously used metal catalyst gauze are fabricated into suitable articles that are placed in contact with a metal catalyst, such as a metal catalyst gauze. The present invention enables reliable metal catalyst gauze enhanced ignition by contacting the metal catalyst gauze with one or more pieces of previously used metal catalyst gauze. The pieces of used metal catalyst gauze reduce the activation energy for catalyst ignition (also referred to "light off"), enabling ignition of catalyst gauzes that are new, used, contaminated, damaged and combinations thereof at relatively low auto-ignition temperatures. The present invention does not require any additional down time to prepare a new gauze for service or any special conditioning of the gauze. With the present invention, ignition usually occurs within 15 minutes of feed gas (reactant) introduction onto the gauze. Further, the one or more pieces of previously used metal catalyst gauze are quickly prepared and contacted with the catalyst, minimizing reactor down time as compared to special operations required for coating catalysts or pieces thereof, storing the coated catalysts safely and the expense associated with platinum or metal coating required.

In accordance with the present invention, the one or more pieces of the used metal catalyst gauze facilitate the "ignition" of a metal catalyst gauze by lowering the activation energy required for ignition to occur. Generally, a period of 15 minutes or less is spent from the introduction of the feed gases until the "ignition" of the gauze. The present invention reduces the amount of feed gases flared prior to light-off and increases yield by avoiding the repeated unsuccessful light-offs often encountered with igniters. The present invention enables new metal catalyst gauzes to ignite at temperatures similar to that of corresponding used metal catalyst gauzes which have relatively higher surface areas. Ignition occurs at the sites where the one or more pieces of previously used metal catalyst gauze contact the metal catalyst gauze, subsequently leading to complete ignition of the catalyst, as confirmed by visual observations and by temperature measurements using thermocouple devices.

In accordance with the present invention, when in contact with a full metal catalyst gauze, one or more pieces of previously used metal catalyst gauze promote ignition of the gauze in industrial scale metal catalyzed reactions. The one or more pieces of previously used metal catalyst gauze may be taken from spent catalysts, damaged catalysts, recycled catalysts, reconditioned catalysts, and combinations thereof. For example, the one or more pieces of previously used metal catalyst gauze are prepared from the same catalyst as the metal catalyst gauze with which the one or more pieces of previously used metal catalyst gauze are used.

The one or more pieces of previously used metal catalyst gauze may comprise one or more metals selected from the group consisting of nickel, platinum, palladium, cobalt, rhodium, silver, gold, copper, iridium, rhenium, cerium, alloys thereof, binary alloys thereof, ternary alloys thereof, intermetallics thereof, and combinations thereof, preferably, a gauze of platinum, platinum alloys or combinations of from 5 to 25 wt. % of platinum and other metals, based on the total amount of metal in the pieces of previously used metal catalyst gauze.

In accordance with the present invention, both new and used metal catalyst gauzes and pieces thereof may comprise metals that include, but are not limited to, nickel, platinum, palladium, cobalt, rhodium, silver, gold, copper, iridium, rhenium, ruthenium, molybdenum, vanadium, niobium, indium, cerium and alloys thereof. Suitable alloys include, but are not limited to for example, binary alloys such as Pt/Rh, Pt/Ni, Pt/Co, Pt/Ag, Pt/Au, Pt/Cu, Pt/Ir, Pt/Re, Pt/Ru, Pt/Mo, Pt/Ce, Pd/Rh, Pd/Ni, Pd/Co, Pd/Ag, Pd/Cu, Rh/Co, Rh/Ni, Rh/Ag, Rh/Ru; ternary alloys such as Pt/Pd/Rh, Pt/Pd/Ni, Pt/Pd/Ag, Pt/Pd/Ru, and Pt/Pd/Co. Other suitable metals include intermetallics selected from the group consisting of nickel, platinum, palladium, cobalt, rhodium, silver, gold, copper, iridium, rhenium, ruthenium, molybdenum, and cerium. Examples include, but are not limited to, $Pt_{0.1-1.99}Rh_{0.99-0.01}$, $Pt_2Rh$, $Ni_{0.1-1.99}Pt_{0.99-0.01}$, $Pt_xRh_y$, $Pt_xNi_y$, $Pt_xCo_y$, $Pt_xRh_yIr_z$, and $Pt_xRh_yIr_z$, wherein x=0.1-100, y=0.1-100 and z=0.1-100. As used herein, the term "intermetallics" refers to discrete intermediate compounds having stoichiometric or non-stoichiometric formulas, as compared to alloys (solid solutions of two or more metals).

Preferably, both the metal catalyst gauze and the pieces of previously used metal catalyst gauze comprise as one or more or all layers a platinum-rhodium containing from 0 to 10 wt. % rhodium and 100 to 90 wt. % platinum, based on total metal catalyst gauze solids in the respective metal catalyst gauze or pieces thereof.

Suitable metal catalyst gauze materials and pieces of previously used metal catalyst gauze for use in the present invention may include, for example, metal catalyst gauze packs containing multiple layers of gauze, for example, 5 to 25 gauze layers of metal gauze or wire, such as platinum-rhodium gauze.

In accordance with the present invention, methods of making metal catalyst materials for improving the ignition of metal catalysts in a reactor, such as a converter, used to oxidize gaseous reactants comprise shaping one or more pieces, such as 1 to 20, or preferably, from 3 to 10, of previously used metal catalyst gauze by cutting or removing one or more sections of a previously used metal catalyst gauze, followed by contacting each of the one or more pieces of previously used metal catalyst gauze with a new or used metal catalyst gauze in a reactor. The methods of using these materials comprise igniting the resulting metal catalyst gauze and pieces of metal catalyst gauze in contact therewith in the presence of gaseous reactants.

The pieces of used gauze may be prepared in a variety of three-dimensional forms, wherein one or more forms of gauze may be used together. Suitable forms of the pieces of used gauze include, but are not limited to for example, fibers, wires, needles, foams, spongy masses, porous solids, porous particles, fibrous sheets, knitted gauzes, woven gauzes and combinations thereof.

Shaping the used metal catalyst gauze into one or more pieces may comprise cutting it into as a ring or into pieces with a length-to-width ratio in the range of 1 to 10. Preferably, the pieces are placed equidistant from each other on the surface of a metal catalyst gauze inside of a reactor process pressure vessel (converter) where the catalytic reaction, for example, hydrogen cyanide production reaction takes place. The methods are carried out when the reactor is down. Then, if need be, the reactor converter is reassembled. Thus, in reactors accessed through automated or robotic means, no disassembly may be required.

The methods in accordance with the present invention can be used to improve the ignition of one or more metal catalysts gauzes selected from the group consisting of new catalysts, used catalysts, recycled catalysts, reconditioned catalysts, damaged catalysts, contaminated catalysts and combinations thereof.

In accordance with the present invention, methods of using the metal catalyst materials for improving the catalyst enhanced ignition of reactants in a reactor used to oxidize gaseous reactants, such as a converter, may include manufacturing hydrogen cyanide comprising the step of contacting a platinum/rhodium catalyst with one or more pieces of the previously used metal catalyst gauze, feeding in the gaseous reactants with air or oxygen and igniting the reactor.

In accordance with the methods for using the pieces of previously used metal catalyst gauze for improving the catalyst enhanced ignition of reactants using metal catalyst gauze in a reactor, such as a converter, the one or more metal catalyst gauzes may be selected from the group consisting of new catalysts, used catalysts, recycled catalysts, reconditioned catalysts, damaged catalysts, contaminated catalysts and combinations thereof.

In the methods of using the one or more pieces of previously used metal catalyst gauze, the present invention enables light off of metal catalyst gauzes contaminated with one or more organic compounds that include, but are not limited to for example, lubricating oils, compressor oils, paraffin residues, C8-C22 hydrocarbons in reactants, oil residues, residues in reactants, reactor debris, soot, dust, product residues and combinations thereof. Ignition of reactants occurs at uncontaminated sites where the ignition promoting articles contact the catalyst, subsequently leading to complete ignition of the catalyst, as confirmed by visual observations and by temperature measurements using thermocouple devices. Preferably, ignition promoted light off is successful in contaminated catalysts during a short preheating period while admitting the feed into the catalytic converter for immediate light off.

The present invention enables improved catalyst enhanced ignition using new catalysts as well as catalysts damaged by events that that include, but are not limited to for example, high temperature flare off of reactants, oxidation of catalyst, destruction of catalytic sites, unfavorable reactions not leading to products and combinations thereof. For example, the one or more pieces of previously used metal catalyst gauze may be placed in contact with a damaged catalyst at damaged sites, providing repair of the damaged catalyst site. Ignition of reactants occurs at damaged sites of the catalyst, subsequently leading to complete ignition of the catalyst, as confirmed by visual observations and by temperature measurements using thermocouple devices.

The one or more pieces of previously used metal catalyst gauze of the present invention enable light off of used catalysts, recycled catalysts and reconditioned catalysts through reconstruction of catalytic sites. Generation of product specific catalytic sites is a dynamic process during catalysis and catalytic sites are continuously created and destroyed. In some cases, destruction of catalytic sites is so severe that product yields drop precipitously and the reaction is shut down. In the methods, the one or more pieces of previously used metal catalyst gauze are placed at reconstructed catalytic sites to reconstruct the catalytic sites with immediate light off of the used, recycled or reconditioned catalyst, subsequently leading to complete ignition of the catalyst, as confirmed by visual observations and by temperature measurements using thermocouple devices.

The present invention provides methods of improving the ignition of gaseous reactants in metal catalyzed oxidation reactions and use of metal catalyst gauzes having in contact therewith one or more pieces of previously used metal catalyst gauze in a reactor, such as a converter, used to oxidize gaseous reactants reactor. The methods comprise introducing a gas mixture of oxygen or air and one or more reactant gases into the reactor to contact the catalyst, igniting the gas mixture at the location of one or more or all pieces of the previously used metal catalyst where they are placed in contact with the metal catalyst gauze.

Preferably, to aid in ignition of the gases used in the methods of using the one or more pieces of previously used metal catalyst gauze, such raw material gases are mixed and preheated by the reactor or in equipment adjacent the reactor.

The methods of using pieces of previously used metal catalyst gauze may include producing hydrogen cyanide from the oxidative coupling of methane and ammonia using platinum-rhodium (Pt/Rh) gauzes. Such gauzes typically consist of metal alloys, including but not limited to for example, Pt/Rh (90%/10%), Pt/Rh (95%/5%) and Pt/Rh/Pd (90%/5%/5%). Gauzes are typically made of wire in flat woven meshes of metal wires having a diameter of from 0.007 to 0.25 cm in diameter, such as from 0.008 to 0.025 cm in diameter with from 30 to 100 meshes/cm. A suitable gauze may be a flat woven mesh having, for example, a minimum diameter of approximately 0.003 inch (0.008 cm)

with at least 80 meshes per inch (31.5 meshes/cm). In the methods of use, the one or more pieces of previously used metal catalyst gauze are placed in contact with an Pt/Rh catalyst and ignition temperatures were measured by thermocouple devices. Ignition of preheated feed gases generally occurs in the vicinity of the one or more pieces of previously used metal catalyst gauze at temperatures of from 225 to 300° C., or, preferably from 230 to 260° C. The temperatures climb to operating temperatures of from 1000 and 1250° C., or, preferably, from 1100 to 1250° C., in a plant operating at an optimized reactant mass throughput.

The methods of using pieces of previously used metal catalyst gauze may include producing nitric acid from the oxidation of an ammonia-air mixture. Gauzes typically used for the production of nitric acid typically consist of platinum group metal alloys primarily 90% Pt:10% Rh and 90% Pt:5% Rh:5% Pd and are typically woven meshes of about 0.003 of an inch diameter wires at about 80 wires per lineal inch. Other combinations of mesh and wire diameter may be used to advantage. For a detailed report, see Roberts and Gillespie, "Estimation of Platinum Catalyst Requirement for Ammonia Oxidation" 45 Advances in Chemistry Series No. 133, Chemical Reaction Engineering II page 600-611. See also U.S. Pat. No. 3,660,024. The one or more pieces of previously used metal catalyst gauze may be prepared by cutting 7-10 irregular or regular sized sections of a used catalyst gauze having a minimum area of 4 cm$^2$. In the methods of use, the pieces may be placed in contact with a Pt/Rh catalyst and ignition temperatures were measured by thermocouple devices. Ignition of preheated feed gases occurs in the vicinity of the one or more pieces at temperatures between 230 to 260° C. in a plant operating at a reactant mass throughput of 8500 lbs/ft$^2$-hr.

The methods of using pieces of previously used metal catalyst gauze may include production of acetylene from the oxidation of a methane-air mixture. Conventional ignition of reactants occurs by passing preheated feed gases on multiple layers of platinum gauze and Pt-coated monoliths (e.g. α-Alumina) or rhodium gauze at temperatures greater than 500 to 800° C. The catalytic activation of methane and subsequent coupling of methyl radicals occurs at crystalline sites on the surface of the catalyst. The one or more pieces of previously used metal catalyst gauze may be prepared by cutting 7-10 irregular or regular sized sections of a used catalyst having a minimum area of 4 cm$^2$. In the methods of use, the pieces may be placed in contact with the catalyst and ignition temperatures measured by thermocouple devices. Ignition of preheated feed gases occurs in the vicinity of the ignition promoting articles at temperatures less than 500° C. operating at space velocities of at least $10^5$ h$^{-1}$.

The methods of using pieces of previously used metal catalyst gauze may include production of $C_2$-$C_8$ alkenes from the oxidation of a $C_2$-$C_8$ alkanes-air mixture. Ignition of reactants occurs by passing preheated feed gases on multiple layers of supported and unsupported platinum or rhodium catalysts at temperatures greater than 500° C. The one or more pieces of previously used metal catalyst gauze may be prepared by cutting 7-10 irregular or regular sized sections of a used catalyst having a minimum area of 4 cm$^2$; these may be placed in contact with the catalyst and ignition temperatures measured by thermocouple devices. Ignition of preheated feed gases occurs in the vicinity of the ignition promoting articles at temperatures less than 500° C. operating at space velocities of at least $10^5$ h$^{-1}$.

The methods of using pieces of previously used metal catalyst gauze may include production of synthesis gas from the oxidation of methane by steam reforming. Ignition of reactants occurs by passing preheated feed gases on a Ni catalyst, including Ni supported on a ceramic monolith) at temperatures between 1000-1500° C. under pressure (20 bar to 85 bar). The one or more pieces of previously used metal catalyst may be prepared by cutting 7-10 irregular or regular sized sections of a used catalyst having a minimum area of 4 cm$^2$ and placing them in contact with the catalyst. Ignition temperatures can be measured by thermocouple devices. Ignition of preheated feed gases occurs in the vicinity of the ignition promoting articles at temperatures less than 1000° C. operating at space velocities of at least $10^4$ h$^{-1}$.

EXAMPLES

The following examples are provided to further demonstrate the utility of the present invention and are representative of the claimed scope of the present invention.

Examples 1 to 2

In each of the following Examples, a hydrogen cyanide reactor that comprises a cylindrical reactor vessel (102.4 cm inner diameter (ID) or 4 ft ID), was equipped with inlet piping to introduce a preheated gas feed into the reactor, a gauze holder that supports a metal catalyst gauze, a new metal catalyst gauze having a specified material composition and weight, a downstream shell-and-tube heat exchanger to cool the reactor product gas, and outlet piping to transfer the product gas to downstream refining units. In each example, an indicated amount of an indicated previously used metal catalyst gauze material was fashioned into an indicated number pieces and arranged in the indicated manner in contact with the new metal catalyst gauze. In each example, a given reactant gas mixture was preheated to the indicated temperature and then fed into the reactor. Separately, preheated air was used to heat the metal catalyst gauze to a specified temperature. The reactant gas mixture was then ignited at the surface of the pieces of previously used metal catalyst gauze that were in contact with the new metal catalyst gauze. To detect ignition, a given number of thermocouples were placed directly under the metal catalyst gauze at regularly spaced intervals to provide temperature measurement across the metal catalyst gauze. There was no relation between the location of the pieces of used metal catalyst gauze and the thermocouples. Ignition was indicated by a rapid rise in at least one thermocouple reading.

Example 1: The reactor was equipped with a new platinum-rhodium (90% Pt, 10% Rh) metal catalyst gauze pack containing 12 layers of gauze weighing 11914 grams; the preheated feed gas mixture contained ammonia, natural gas (90-95% methane), and air in roughly a 1:1:10 volumetric ratio. Approximately 76 grams of the pieces of a used platinum-rhodium (90% Pt, 10% Rh) metal catalyst gauze (0.64 wt. % of pieces, based on total metal catalyst gauze weight) were cut in strips (approximately 7 strips), roughly 2.54 cm×5.08 cm in size, were placed roughly equidistant from each other on the new metal catalyst gauze and distributed across the new metal catalyst gauze. All told, 8 thermocouples were used. The three feed gases were premixed and preheated to 225° C.; a separate air feed was preheated to a temperature of equal to or greater than 300° C. and was fed to the reactor to preheat the new gauze. Once the gauze reached the preheat temperature of the air feed, the ammonia-methane-air mixture was introduced into the reactor to cause ignition at the gauze surface.

On the first try and within 2 minutes of introduction of the feed gas mixture, the area at the surface of the gauze ignited and operating temperature rose to 1150° C. to convert ammonia and methane to hydrogen cyanide over the metal catalyst gauze.

Example 2: Example 1 was repeated except that a reactor was used that was equipped with a weak air heater, only a total of 56 grams of about 7 pieces of previously used metal catalyst gauze, and a new gauze weighing 12043 grams (0.46 wt. % of pieces, based on total metal catalyst gauze weight). The new metal catalyst gauze was preheated to 238° C. at time of feed introduction On the first try and within 8 minutes of introduction of the feed gas mixture, the area at the surface of the gauze ignited and operating temperature rose to 1150° C. to convert ammonia and methane to hydrogen cyanide over the platinum gauze.

Comparative Examples: Example 1 was repeated in four different reactors, except that the reactant and air gas mixture was preheated to 250° C. and as high as 265° C. and no pieces of previously used metal catalyst gauze were used. In each Comparative Example, the ignition using the new metal catalyst gauze required multiple attempts at ignition (from 4 to 11 attempts). When the same reactor was used as in Example 2, above, it took 4 attempts to ignite the gas mixture; when the same reactor was used as in Example 1, above, it took 9 attempts to ignite the gas mixture. Thus, the present invention prevents substantial reactor downtime and improves product yield.

We claim:

1. A metal catalyst material comprising a metal catalyst gauze comprising wires or metal threads having a diameter of from 0.007 to 0.25 cm in diameter and having in contact therewith, from 0.5 to 1.5 wt. %, based on the weight of the metal catalyst gauze, of one or more pieces of previously used metal catalyst gauze, that have not been contaminated with iron and that have not been contaminated with foreign debris, hydrocarbons, or oil as tested by visual inspection, the one or more pieces placed equidistant from each other on the surface of the metal catalyst gauze, or, if one piece, placed in contact with or concentrically with the center of the metal catalyst gauze.

2. The metal catalyst material as claimed in claim 1, wherein the one or more pieces of previously used metal catalyst gauze comprise used platinum/rhodium catalyst gauze.

3. The metal catalyst material as claimed in claim 1, wherein the amount of the one or more pieces of previously used metal catalyst gauze ranges from 0.5 to 1.0 wt. %, based on the weight of the metal catalyst gauze.

4. The metal catalyst material as claimed in claim 1, wherein the one or more pieces of previously used metal catalyst gauze numbers from 2 to 20 pieces.

5. The metal catalyst material as claimed in claim 1, wherein each of the one or more pieces of previously used metal catalyst gauze comprises a gauze of one or more metals selected from the group consisting of nickel, platinum, palladium, cobalt, rhodium, silver, gold, copper, iridium, rhenium, cerium, alloys thereof, binary alloys thereof, ternary alloys thereof, intermetallics thereof, and combinations thereof.

6. The metal catalyst material as claimed in claim 1, wherein the metal catalyst gauze is chosen from new catalysts, used catalysts, recycled catalysts, reconditioned catalysts, damaged catalysts, contaminated catalysts and combinations thereof.

7. The metal catalyst material as claimed in claim 1, wherein the metal catalyst gauze and the pieces of previously used metal catalyst gauze are each made from the same metal, metal alloy or combination of metals.

8. A method of making metal catalyst materials for improving the ignition of gas reactants at the surface of the metal catalyst material, wherein the metal catalyst is a metal catalyst gauze comprising wires or metal threads having a diameter of from 0.007 to 0.25 cm in diameter and chosen from a chosen from new catalysts, previously used catalysts, recycled catalysts, reconditioned catalysts, damaged catalysts, contaminated catalysts and combinations thereof comprising shaping from 1 to 20 pieces of a previously used metal catalyst gauze material that have not been contaminated with iron, and that have not been contaminated with foreign debris, hydrocarbons, or oil as tested by visual inspection, and placing the pieces of the previously used metal catalyst gauze equidistant from each other in contact with or on the surface of the metal catalyst gauze or, if one piece, placed in contact with or concentrically with the center of the metal catalyst gauze, wherein the total amount of the pieces of the previously used metal catalyst gauze ranges from 0.5 to 1.5 wt. %, based on the weight of the metal catalyst gauze.

9. The methods of making as claimed in claim 8, wherein the metal catalyst gauze is a platinum/rhodium catalyst gauze.

10. A method of improving the ignition of gas reactants at the surface of a metal catalyst gauze comprising wires or metal threads having a diameter of from 0.007 to 0.25 cm in diameter in a reactor having in contact with the metal catalyst gauze one or more pieces of previously used metal catalyst gauze that have not been contaminated with iron and that have not been contaminated with foreign debris, hydrocarbons, or oil as tested by visual inspection, the methods comprising preheating the metal catalyst gauze with air, at a temperature of from 250 to 335° C., preheating a gas mixture of air or oxygen and one or more reactant gases to a temperature of from 220 to 300° C. and feeding it into the reactor to ignite the gas mixture at one or more or all pieces of the previously used metal catalyst, wherein the total amount of such pieces of the previously used metal catalyst gauze ranges from 0.5 to 1.5 wt. %, based on the weight of the metal catalyst gauze.

\* \* \* \* \*